United States Patent
Lai et al.

(10) Patent No.: US 6,912,326 B2
(45) Date of Patent: Jun. 28, 2005

(54) METHOD FOR DISPLAYING AN ELECTRONIC DOCUMENT ON A DIGITAL HANDHELD DEVICE

(75) Inventors: Cheng-Shing Lai, Taipei Hsien (TW); Feng Zhang, Shanghai (CN); Bo Liu, Nanjing (CN)

(73) Assignee: Inventec Appliances Corp., Taipei (TW)

( * ) Notice: Subject to any disclaimer, the term of this patent is extended or adjusted under 35 U.S.C. 154(b) by 595 days.

(21) Appl. No.: 10/063,882

(22) Filed: May 21, 2002

(65) Prior Publication Data

US 2003/0218620 A1 Nov. 27, 2003

(51) Int. Cl.$^7$ ................................................. G06K 9/32
(52) U.S. Cl. ...................... 382/298; 382/299; 382/313; 345/696; 345/698; 379/433.04
(58) Field of Search ................................ 382/282, 286, 382/298, 299, 313; 345/695, 696, 698; 379/428.03, 433.04

(56) References Cited

U.S. PATENT DOCUMENTS

| 5,485,504 | A | * | 1/1996 | Ohnsorge ..................... 455/566 |
| 5,491,507 | A | * | 2/1996 | Umezawa et al. ........ 348/14.02 |
| 5,604,788 | A | * | 2/1997 | Tett ........................... 455/412.1 |
| 6,278,447 | B1 | * | 8/2001 | Anderson .................... 715/723 |
| 6,674,439 | B1 | * | 1/2004 | Shin et al. ................... 345/501 |

* cited by examiner

Primary Examiner—Bhavesh M. Mehta
Assistant Examiner—Yosef Kassa
(74) Attorney, Agent, or Firm—Winston Hsu

(57) ABSTRACT

A method of displaying an electronic document on a digital handheld device first calculates a reduction ratio equal to a ratio of an original document width to the digital handheld device screen width. The method then calculates color values of pixels in a reduced document by processing color values of an array of pixels in the original document. The method builds the reduced document having a size related to the original document by the reduction ratio. Finally, the method displays the reduced electronic document on the digital handheld device screen, and allows a user to switch between the original and reduced documents.

15 Claims, 7 Drawing Sheets

METHOD FOR DISPLAYING AN ELECTRONIC DOCUMENT ON A DIGITAL HANDHELD DEVICE

BACKGROUND OF INVENTION

1. Field of the Invention

The present invention relates to a method for displaying an electronic document on a digital handheld device, and more specifically to a method for reducing the size of the electronic document to be displayed on the digital handheld device.

2. Description of the Prior Art

Currently, there is a wide variety of digital handheld devices available to consumers. One popular type of digital handheld device is a personal digital assistant (PDA). PDAs are portable and are commonly used to read electronic documents such as web pages. A user can store, manipulate, and access large amounts of information in the form of electronic documents with the aid of a PDA.

A large number of PDA users want to be able to view documents originating from a personal computer (PC) on their PDAs. For example, if a user downloads a web page from the Internet using his PC but wishes to read the web page while commuting, he can simply transfer the web page to his PDA. Then, while commuting, the user can browse the web page at his leisure.

The prior art method for displaying an electronic document on a PDA is illustrated in FIG. 1. Shown in FIG. 1 is a typical PDA 10 comprising a user interface 12 and a screen 14. The screen 14 is made up of a plurality of pixels, and has a width of 240 pixels and height of 320 pixels. Displayed on the screen 14 are a horizontal scroll bar 16, a vertical scroll bar 18, and a portion of an electronic document 20. The electronic document 20 originated from a PC and has a size larger than the size of the PDA screen 14, for example 810 pixels wide by 1974 pixels high, and consequently cannot be displayed in entirety the screen 14. As a result, the PDA screen 20 can only display a portion of the document 20 at a given time.

When a user views the document 20, the user must control the scroll bars 16 and 18 by touching a stylus to the screen 14 to scroll the document to the desired portion. Alternatively, the user can employ the user interface 12 to scroll the document 20. As the document 20 actually requires twenty-eight PDA screens to view entirely, the user may find this to be tiresome. Additionally, viewing a relatively small portion of the whole document 20 may cause difficulty for the user in understanding the document 20.

The prior art method of displaying an electronic document on a handheld device is inconvenient and can lead to misunderstanding of the electronic document.

SUMMARY OF INVENTION

It is therefore a primary objective of the claimed invention to provide a method for displaying an electronic document on a handheld device in a reduced form to solve the problems of the prior art.

According to the claimed invention, a digital handheld device comprises a screen on which to view an electronic document, the screen having a plurality of pixels and having a width in pixels and a height in pixels. The method first provides an original document comprising a plurality of pixels, and having a width in pixels and a height in pixels, then calculates a reduction ratio equal to a ratio of the original document width to the digital handheld device screen width. The method then processes color values of a two dimensional array of pixels of the original document, and builds a reduced document comprising a plurality of pixels. The reduced document has a width in pixels equal to the width of the original document divided by the reduction ratio and a height in pixels equal to the height of the original document divided by the reduction ratio, and a color value of each pixel determined by said processing. Finally, the method displays the reduced electronic document on the digital handheld device screen.

A color value of a pixel in the reduced document, resulting from the abovementioned processing of color values, can be a weighted arithmetic mean, a median value, or a numerical mode of the color values of the array of pixels of the original document.

According to the claimed invention, the method further comprises displaying a portion of the original document on the digital handheld device screen when a user selects a region of the reduced document.

It is an advantage of the claimed invention that the reduced document can be displayed on the screen of the digital handheld device such that a larger and more understandable portion of the original document can be viewed by a user, while the visual quality of the content of the original document is preserved. Furthermore, the claimed invention allows the user to access the original document in a convenient manner by selecting a portion of the reduced document.

These and other objectives of the claimed invention will no doubt become obvious to those of ordinary skill in the art after reading the following detailed description of the preferred embodiment that is illustrated in the various figures and drawings.

DETAILED DESCRIPTION

The present invention method will be described in an embodiment that utilizes an arithmetic mean function to reduce an electronic document so it can be displayed on a screen of a handheld device. The electronic document is reduced with reference to its width and the width of the handheld device screen.

Figure 1:
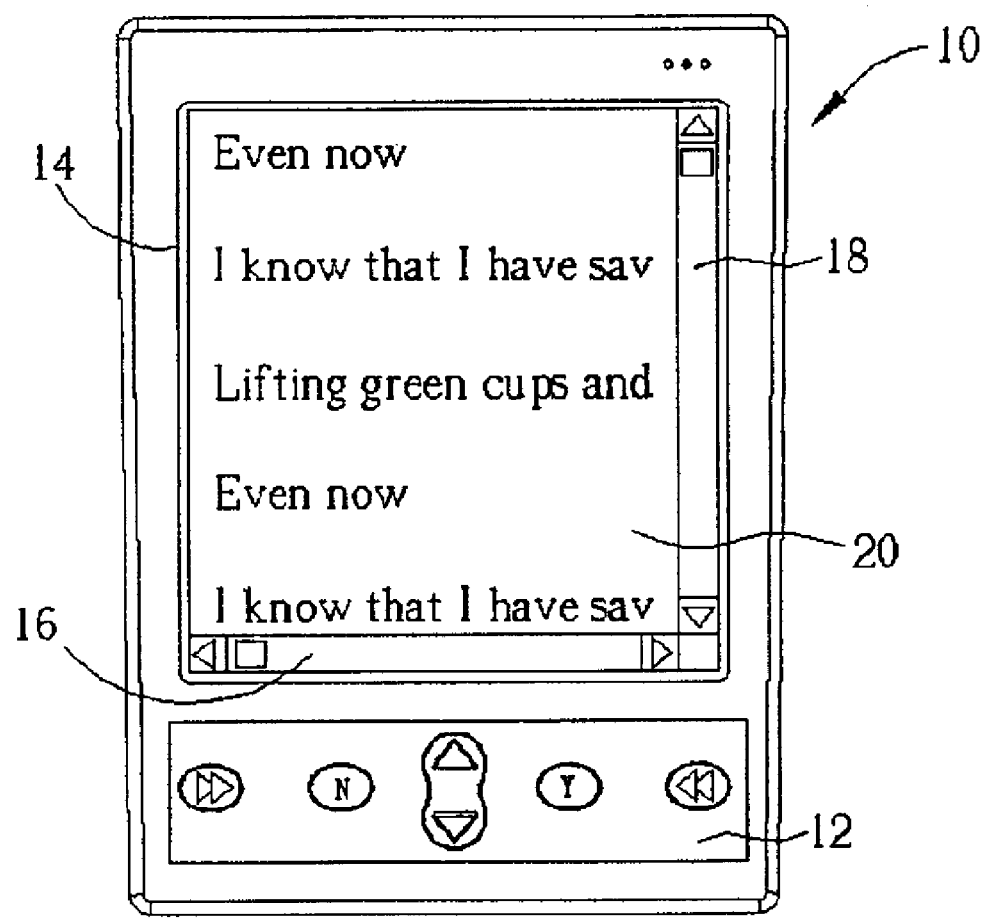
FIG. 1 is a front view of a PDA displaying an electronic document on a screen according to the prior art.
Figure 2:
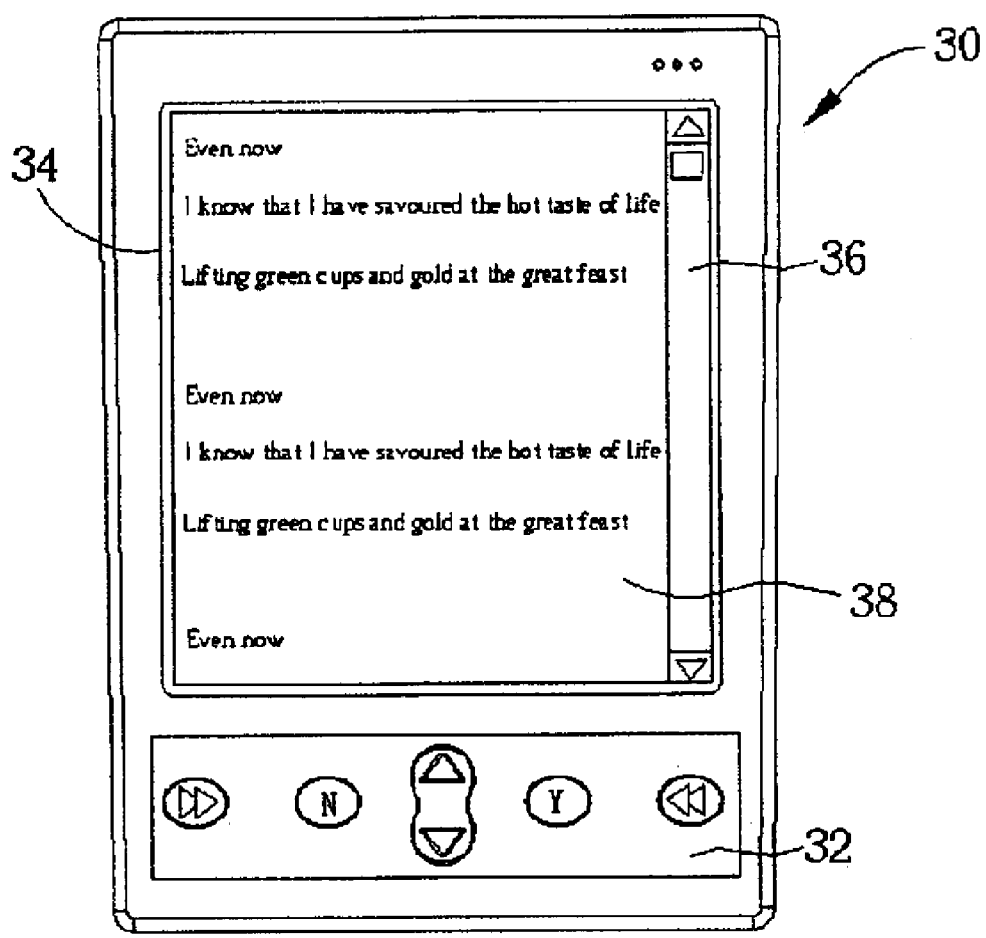
FIG. 2 is a front view of a PDA displaying an electronic document on a screen according to the present invention.

Please refer to FIG. 2, which shows a digital handheld device 30, in this case a PDA, displaying an electronic document 38, such as a web page, on a screen 34 according to the present invention. The present invention is not limited to a PDA and can be applied to a cellular phone, tablet PC, or any other digital handheld device having a pixel-based screen. The PDA includes a user interface 32, which includes a stylus that is not shown. The screen 34 also displays a vertical scroll bar 36. The document 38 displayed has been reduced according to the present invention method.

The PDA screen 34 is a touch sensitive TFT matrix that comprises a plurality of pixels and has a width of 240 pixels and a height of 320 pixels. The size of the screen 34 does not limit the invention, and another readily available screen size is 160 pixels square. A user can manipulate what is displayed on the screen 34 by applying the stylus to the scroll bar 36, or by using the user interface 32. For example, the user can control the scroll bar 36 to cause the screen 34 to display the unseen portion of the reduced document 38.

Figure 3A:
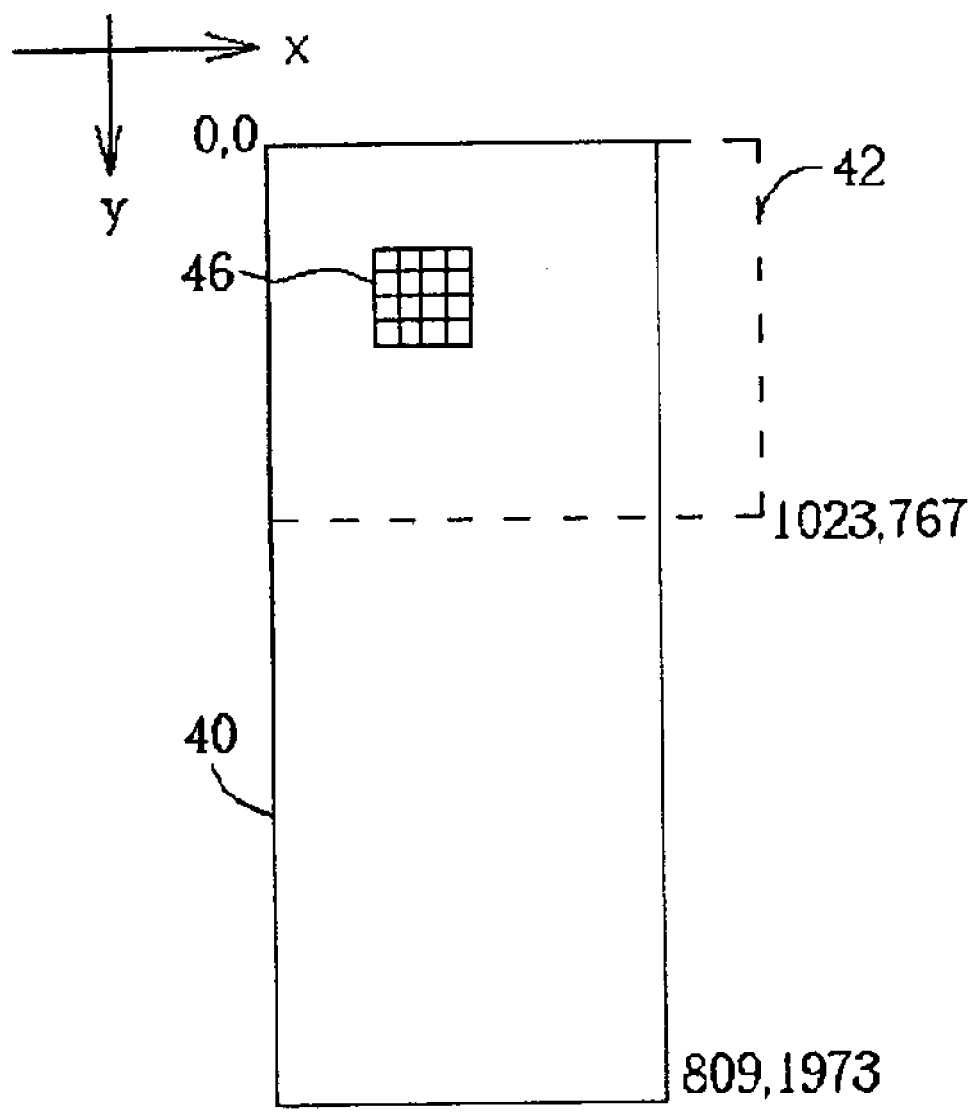
FIG. 3A is a schematic diagram of an original document according to the present invention.

The reduced document 38 shown on the PDA screen 34 is a reduced copy of an original document. Referring to FIG. 3A, the original document 40 has a width, ranging from x coordinates 0 to 809, of 810 pixels, and a height, ranging from y coordinates 0 to 1973, of 1974 pixels. Note that the local origin of the x-y coordinate system (0,0) is at the top-left of the original document 40. An array of pixels 46 of the original document 40 is shown exaggerated in size. The original document 40 is displayed on a PC monitor having PC screen extents 42. The screen extents 42 represent a typical PC screen size of 1024 pixels wide by 768 pixels high, and range from x and y coordinates 0 to 1023 and 0 to 767 respectively. The entire width of the original document 40 fits within PC screen extents 42 and can be fully displayed on a PC screen. The entire length of the document 40 does not entirely fit within the PC screen extents 42, and can be scrolled to be fully displayed. According to this embodiment of the present invention, the width and height of the original document 40 can have any values provided that the width of the original document 40 is larger than the width of the PDA screen 34.

Figure 3B:
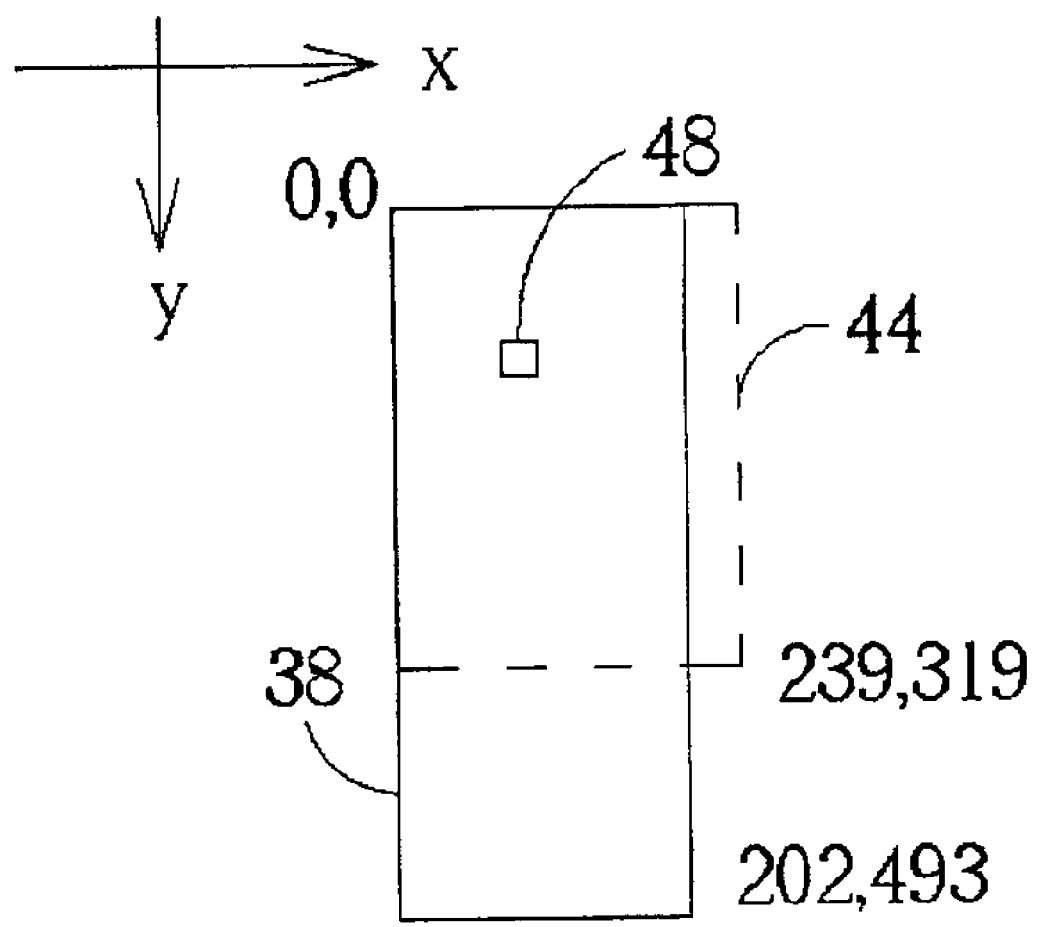
FIG. 3B is a schematic diagram of a reduced document according to the present invention.

The reduced document 38 is shown in FIG. 3B and has a width of 203 pixels, ranging from 0 to 202, and a height of 494 pixels, ranging from 0 to 493. Note that the reduced document 38 also has a local x-y origin of (0,0) at the top-left corner. PDA screen extents 44 are illustrated representing the size of the PDA screen 34, shown in FIG. 2, of 240 pixels wide by 320 pixels high. Accordingly, the PDA screen extents 44 range from x coordinates 0 to 239, and from y coordinates 0 to 319. A pixel 48, corresponding to the pixel array 46, is shown in the reduced document 38 exaggerated in size.

The method reduces the original document 40 by a factor of 4 to create the reduced document 38. The reduction factor k of 4 is determined by dividing the original document width of 810 pixels by the PDA screen width of 240 pixels and rounding the result up to the nearest integer using a ceiling function. This approach to calculating the reduction factor k ensures that the entire width of the reduced document 38 can be displayed on the PDA screen extents 44, and is described by the following formula:

$$k = \left\lceil \frac{W_O}{W_{RS}} \right\rceil \quad \text{(Eq. 1-1)}$$

where, k is the reduction factor; note the ceiling function brackets;

$W_O$ is the width of the original document in pixels;

$W_{RS}$ is the width of the reduced screen in pixels, and in this case is the width of the PDA screen 34;

As previously mentioned the width of the reduced document 38 is 203 pixels. The value of 203 is attained by dividing the width of the original document 40, which is 810 pixels, by the reduction factor of 4 and rounding the result up to the nearest pixel. Rounding this result down would result in information being lost. The height of the reduced document 38 of 493 pixels is attained by an identical operation. The reduction factor k can also be determined using the ratio of the height of the original document 40 to the height of the PDA screen 34. In this embodiment however, the width is the dimension of importance.

Figure 4A:
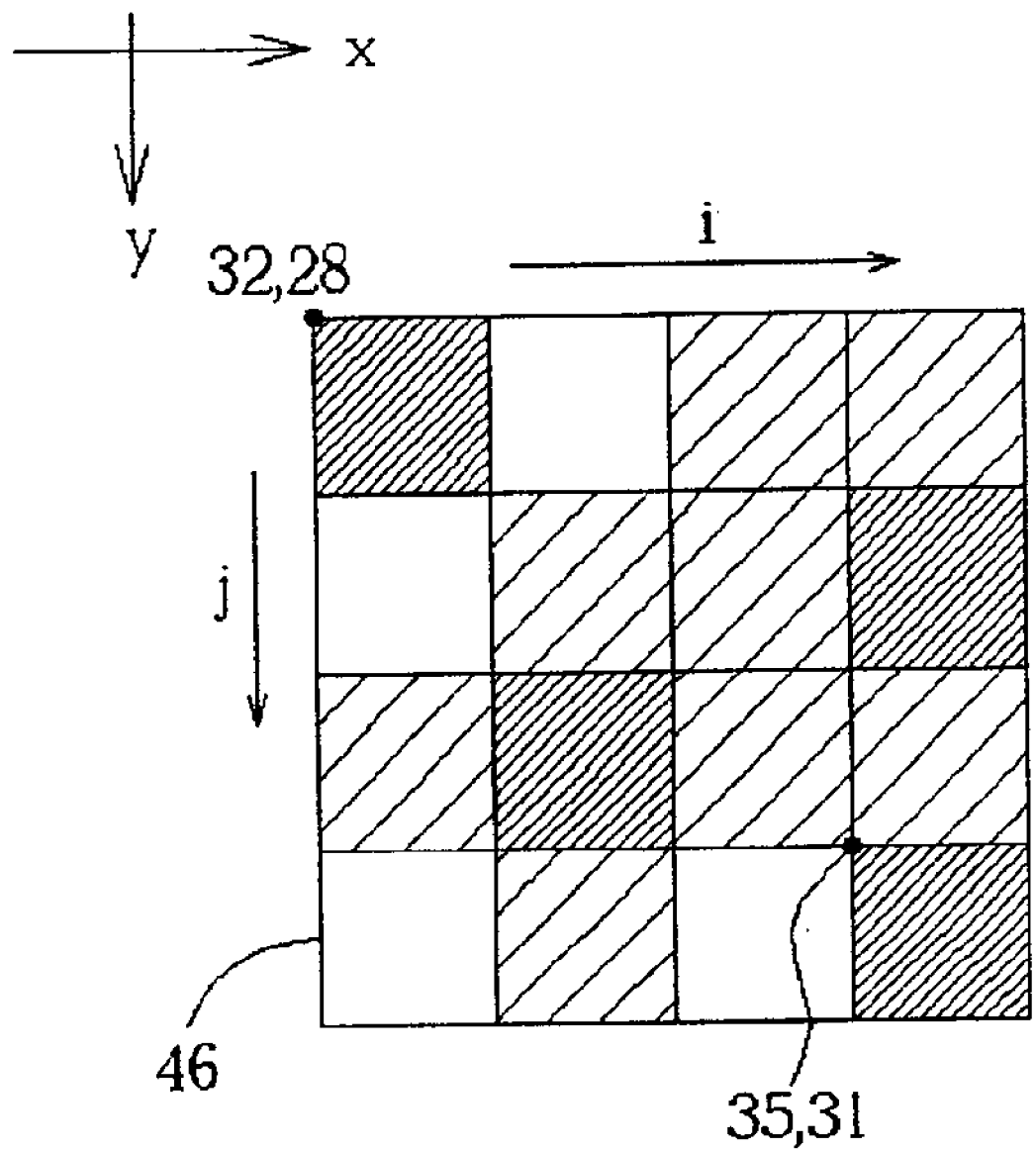
FIG. 4A is a schematic diagram of the pixel array shown in FIG. 3A
Figure 4B:
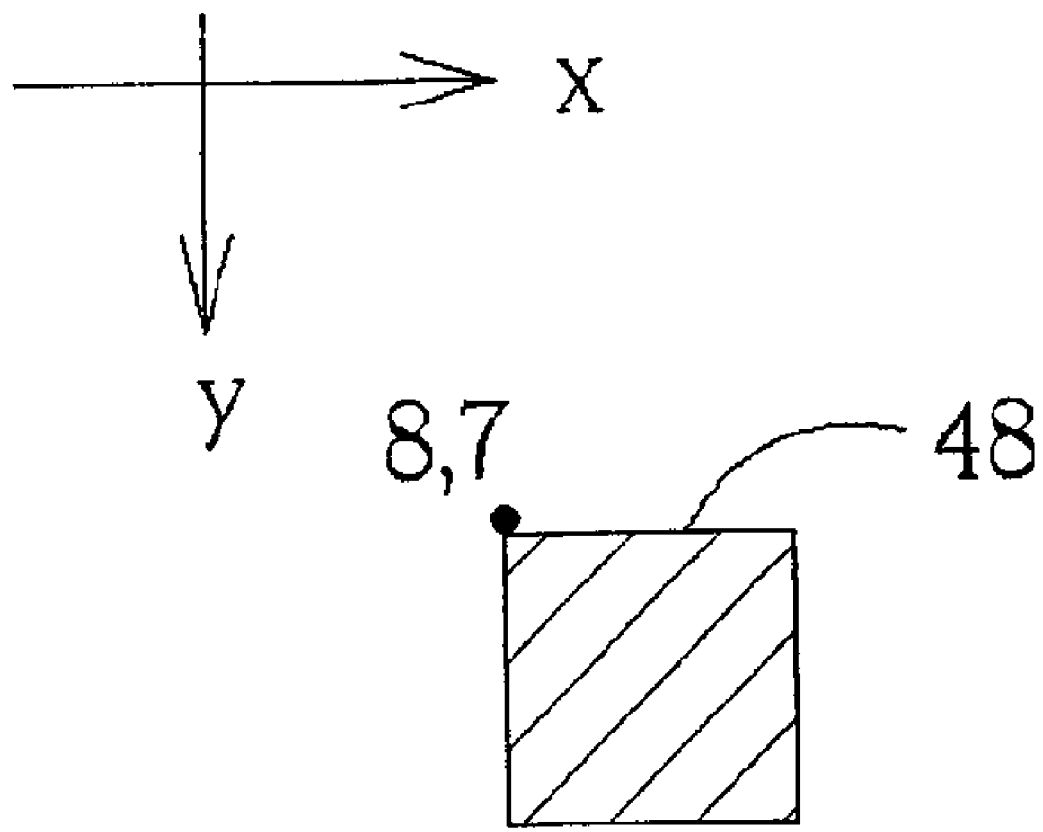
FIG. 4B is a schematic diagram of the pixel shown in FIG. 3B.

Once the size of the reduced document 38 is determined, information of the original document 40 must be processed. The method uses pixel arrays to sample the pixels of the original document 40 in order to construct the reduced document 38. The method relates the pixels of the reduced document to the pixel arrays in the original document according to the following equation:

$$CV_R(x, y) = \frac{\sum_{j=0}^{J} \left[ \sum_{i=0}^{I} CV_O(k \cdot x + i, k \cdot y + j) \right]}{k^2} \quad \text{(Eq. 1-2)}$$

where, $CV_R$ is a color value of a pixel in the reduced document 38 at a coordinate (x,y) of the reduced document 38;

$CV_O$ is a color value of a pixel in the original document 40 at a coordinate (k·x+i,k·y+j) of the original document 40;

k is the reduction ratio of the reduced document as determined by Eq. 1-1;

i is a an index of a pixel in the x direction of a pixel array of the original document under consideration; is an upper bound of the pixel array in the x direction;

j is an index of the pixel in the y direction of the pixel array;

J is an upper bound of the pixel array in the y direction;

The method applies equation 1-2 for all the pixels of the reduced document 38 by using all valid (x,y) coordinates. Please refer to FIG. 4A and FIG. 4B showing enlargements of the pixel array 46 and the corresponding pixel 48 respectively. The width and height of the square pixel array 46 are both normally set equal to the reduction ratio k, in this example having a value of 4, by setting the upper bounds I and J to equal k-1, which is a value of 3. The pixel 48 is at an (x,y) coordinate of (8,7) in the reduced document. The corresponding pixel array 46 has an origin in the original document at an (x,y) coordinate of (32,28), and a pixel furthest from the origin with an (x,y) coordinate of (35,31). The various colors of pixels of the array 46 and of the pixel 48 are represented in FIG. 4A and FIG. 4B by varying degrees of shading.

In practical application, the method applies Eq. 1-2 three times for each pixel in the reduced document, one application for each of the red, green, and blue (RGB) color components. The color values $CV_O$ and $CV_R$ represent a single component color for each application of Eq. 1-2 for a particular pixel in the reduced document 38. In effect, the method utilizes Eq. 1-2 to calculate an arithmetic mean of the three color components, represented as RGB triplets, of the pixel array 46 to generate an RGB color value of the pixel 48.

Throughout the bulk of the original document 40 the values of the upper bounds IJ of the array 46 are equal to the reduction factor k minus one, such that the size of the array 46 in both the x and y directions is equal to the reduction factor k. However, when the method reaches a pixel at the rightmost or bottommost position of the reduced document the values of I and J are accordingly reduced to accommodate the true size of the original document 40, which is not constrained to be a multiple of the reduction factor k. Equations 1-3 and 1-4 illustrate how the values of I and J are generally determined.

$$I = \begin{cases} k-1 & x < W_R - 1 \\ W_R - \left\lfloor \dfrac{W_R}{k} \right\rfloor \cdot k & x = W_R - 1 \end{cases} \quad \text{(Eq. 1-3)}$$

$$J = \begin{cases} k-1 & y < H_R - 1 \\ H_R - \left\lfloor \dfrac{H_R}{k} \right\rfloor \cdot k & y = H_R - 1 \end{cases} \quad \text{(Eq. 1-4)}$$

where,

I is the upper bound of the pixel array in the x direction; note the floor function brackets;

k is the reduction ratio of the reduced document as determined in Eq. 1-1;

$W_R$ is the width of the reduced document in pixels;

J is the upper bound of the pixel array in the y direction; again note the floor function brackets;

$H_R$ is the height of the reduced document in pixels;

The terms $W_R-1$ and $H_R-1$ simply correspond to the rightmost column of pixels and the bottommost row of pixels in the reduced document 38. The upper bounds I and J are always equal to or less than a value of k−1, and hence, the pixel array 46 is constrained to have a width and a height equal to or less than the reduction ratio k.

The PDA 30, shown in FIG. 2, further comprises a processor and a memory, which are able to perform the above-described method. The memory stores the original document 40. The processor then performs the method as described on the original document 40 utilizing a buffer portion of the memory to build the reduced document 38. Finally, the reduced document 38 is stored in the memory and displayed on the screen 34 of the PDA 30.

Figure 5:
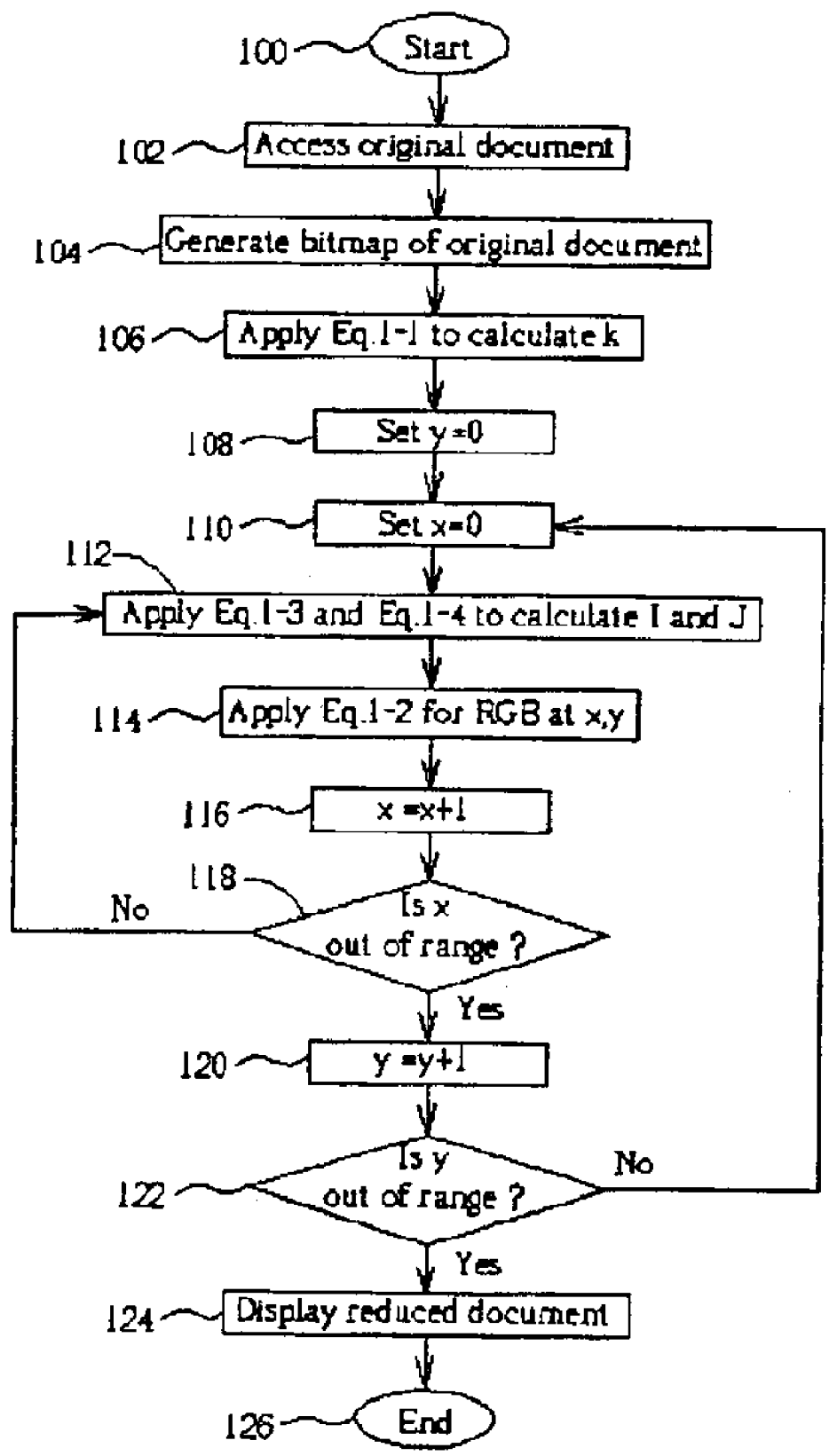
FIG. 5 is a flowchart of the method according to the present invention.

Please refer to FIG. 5, which shows a flowchart of the method according to the present invention. The flowchart shows the method beginning at a coordinate (0,0) and traversing through the entire reduced document referencing a coordinate (x,y).

Step 100: Start;

Step 102: Access the original document 40 stored in the memory of the PDA;

Step 104: Generate and store in a buffer a bitmap image of the original document 40;

Step 106:

Apply Eq. 1-1 to determine the reduction factor k referencing the size of the original document 40 and the width of the PDA screen 34;

Step 108: Set the y coordinate to 0, which represents a first row of pixels in the reduced document 38;

Step 110:

Set the x coordinate to 0, which represents a first column of pixels in the reduced document 38;

Step 112:

Apply Eq. 1-3 and Eq. 1-4 to determine I and J, and the size of the pixel array based on the (x,y) coordinate of the pixel under consideration;

Step 114:

Apply Eq. 1-2 for each RGB color component of the pixel at coordinate (x,y), and set the color of the pixel at (x,y) in the reduced document accordingly;

Step 116: Increment the x coordinate i.e. move to the next pixel in the current row;

Step 118:

Has the last valid x coordinate been exceeded? If it has, go to step 120; if it has not, go to step 112;

Step 120: Increment the y coordinate i.e. move to the next row of pixels;

Step 122:

Has the last valid y coordinate been exceeded? If it has, go to step 124; if it has not, go to step 110;

Step 124: Display the reduced document 38 on the PDA screen 34;

Step 126: End.

After the reduced document 48 has been built and is stored in the memory of the PDA 30 and displayed on the PDA screen 34, a user can then view the reduced document 38 by scrolling vertically through it. If the user needs to see more detail, she can simply apply the user interface 32 to a part of the reduced document 38 to display the original document 40 on the PDA screen 34. The original document 40 is centered on the PDA screen 34 at a location corresponding to a location selected by the user. This feature of the present invention ensures that no original information is lost. Moreover, if the original document 40 is so large that the user cannot easily understand the reduced copy 38, the user can still utilize the reduced document 38 as a map of the original document 40. When the user is finished viewing the detail of the original document 40, she can then redisplay the reduced document 38 from the memory of the PDA without having to regenerate it.

The above-described method, in particular Eq. 1-2, generates a reduced document that contains pixels having arithmetically averaged RGB color values. Different averaging schemes can also be employed. The summation equation 1-2 can be readily modified to provide linear or non-linear weightings, having a value other than unity, to the summed RGB color values. Alternatively, rather than a summation, a median value or a numerical mode of color values could be taken. Finally, the described method of generating color values for pixels of the reduced document is not limited to RGB values and can be made use of for grayscale and monochrome images as well.

Additionally, Eq. 1-2, 1-3, and 1-4 constrain each pixel in the reduced document to correspond to a unique array of pixels in the original document. This one-to-one relationship necessitates that each pixel in the original document is only a member of a single pixel array. This limitation could be modified to allow a pixel to be used in multiple arrays, however the slight increase in image quality of the reduced document may not justify the additional load on the processor of the PDA. This alternative embodiment would allow the reduction ratio k to be a real number.

Finally, if desired the original document can be reduced by setting the reduction ratio k equal to the larger of two ratios. The first ratio is the ratio of the original document width to the PDA screen width, and the second ratio is the ratio of the original document height to the PDA screen height. Using a reduction ratio k equal to the larger of these two ratios would ensure that the entire reduced document could be previewed on the PDA screen without any scrolling being required. In contrast to the prior art, the present invention allows an original electronic document to be displayed in reduced form on a screen of a digital handheld device. The present invention facilitates convenient viewing of a reduced document by a user, and ensures that the information in the document can be readily understood. The present invention can also display the original document when the user wishes, and can just as easily redisplay the reduced document. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for displaying an electronic document on a digital handheld device, the digital handheld device comprising a screen on which to view an electronic document, the screen having a plurality of pixels and having a width in pixels and a height in pixels, the method comprising:
   providing an original document comprising a plurality of pixels, and a having a width in pixels and a height in pixels;
   calculating a reduction ratio equal to a ratio of the original document width to the digital handheld device screen width;
   processing color values of a two dimensional array of pixels of the original document;
   building a reduced document comprising a plurality of pixels, and having a width in pixels equal to the width of the original document divided by the reduction ratio and a height in pixels equal to the height of the original document divided by the reduction ratio, a color value of each pixel of the reduced document determined by said processing; and
   displaying the reduced electronic document on the digital handheld device screen.

2. The method of claim 1 further comprising rounding the reduction ratio up to a nearest integer.

3. The method of claim 2 wherein the array of pixels comprises:
   an origin;
   a width in pixels having a value equal to or less than the reduction ratio; and
   a height in pixels having a value equal to or less than the reduction ratio.

4. The method of claim 3 wherein the origin of the array of pixels is located at an x coordinate of a pixel of the original document that is equal to an x coordinate of a pixel in the reduced document multiplied by the reduction ratio.

5. The method of claim 4 wherein the origin of the array of pixels is located at a y coordinate of a pixel of the original document that is equal to a y coordinate of the pixel in the reduced document multiplied by the reduction ratio.

6. The method of claim 5 wherein each pixel of the original document is used in exactly one array of pixels.

7. The method of claim 1 further comprising displaying a portion of the original document on the digital handheld device screen when a user selects a region of the reduced document.

8. The method of claim 1 wherein the color values of the pixels are RGB color values.

9. The method of claim 1 wherein the original electronic document is a web page.

10. The method of claim 1 further providing a memory in which the original document and the reduced document can be stored.

11. The method of claim 1 wherein the handheld device is a personal digital assistant (PDA), a cellular phone, or a tablet PC.

12. The method of claim 1 wherein the original document width is greater than the digital handheld device screen width.

13. The method of claim 1 wherein the processing of the color values of the two dimensional array of pixels comprises calculating a weighted arithmetic mean of the color values of the two dimensional array of pixels.

14. The method of claim 1 wherein the processing of the color values of the two dimensional array of pixels comprises taking a median value of the color values of the two dimensional array of pixels.

15. The method of claim 1 wherein the processing of the color values of the two dimensional array of pixels comprises determining a numerical mode of the color values of the two dimensional array of pixels.

* * * * *